United States Patent
Scheim et al.

(10) Patent No.: US 10,164,392 B1
(45) Date of Patent: Dec. 25, 2018

(54) TOW VEHICLE ELECTRIC CONNECTOR SYSTEM AND METHOD

(71) Applicant: GM GLOBAL TECHNOLOGY OPERATIONS LLC, Detroit, MI (US)

(72) Inventors: Kobi J. Scheim, Pardess Hanna (IL); Nadav Levkovich, Givatayim (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/632,770

(22) Filed: Jun. 26, 2017

(51) Int. Cl.
| | | |
|---|---|---|
| *B60D 1/64* | (2006.01) | |
| *B60D 1/62* | (2006.01) | |
| *B60R 16/03* | (2006.01) | |
| *H01R 31/06* | (2006.01) | |
| *H01R 13/74* | (2006.01) | |
| *H01R 13/62* | (2006.01) | |

(52) U.S. Cl.
CPC ....... *H01R 31/065* (2013.01); *H01R 13/6205* (2013.01); *H01R 13/745* (2013.01); *B60D 1/62* (2013.01); *B60D 1/64* (2013.01); *B60R 16/0315* (2013.01)

(58) Field of Classification Search
CPC ........ B60D 1/64; B60D 1/62; B60R 16/0315; H01R 13/745
USPC ......... 439/35; 340/431, 539.1; 224/518–521, 224/499, 524–527, 924
See application file for complete search history.

(56) References Cited

U.S. PATENT DOCUMENTS

| | | | | |
|---|---|---|---|---|
| 4,852,901 A | * | 8/1989 | Beasley | B60D 1/36 280/477 |
| 6,222,443 B1 | * | 4/2001 | Beeson | B60D 1/065 307/10.1 |
| 8,888,121 B2 | * | 11/2014 | Trevino | B60D 1/36 280/477 |
| 9,466,988 B2 | | 10/2016 | Deyaf et al. | |
| 9,496,732 B2 | * | 11/2016 | Partovi | H02J 7/0042 |
| 9,834,133 B2 | * | 12/2017 | Bean | B60Q 1/0088 |
| 9,852,843 B2 | | 12/2017 | Davis | |
| 2008/0036927 A1 | | 2/2008 | Sitter et al. | |
| 2012/0024081 A1 | * | 2/2012 | Baker | B60D 1/06 73/862.338 |
| 2013/0020879 A1 | | 1/2013 | Kihara et al. | |
| 2013/0069865 A1 | | 3/2013 | Hart et al. | |
| 2014/0070624 A1 | | 3/2014 | Kim et al. | |
| 2015/0003569 A1 | | 1/2015 | Ji | |
| 2016/0014206 A1 | | 1/2016 | Isobe | |

(Continued)

OTHER PUBLICATIONS

USPTO, Non-final Office Action issued in U.S. Appl. No. 15/644,055, dated Jan. 23, 2018.

(Continued)

*Primary Examiner* — Renee Luebke
*Assistant Examiner* — Paul Baillargeon
(74) *Attorney, Agent, or Firm* — Lorenz & Kopf, LLP

(57) ABSTRACT

A towing vehicle/towed vehicle connection system for operably electrically coupling a towing vehicle to a towed vehicle, the system includes a first transceiver disposed on the towing vehicle to provide a wireless electric power signal. A second transceiver is disposed on the towed vehicle and is wirelessly coupled to the first transceiver to receive the wireless electric power signal. The second transceiver is further coupled to the provide energizing electric power to the towed vehicle.

18 Claims, 2 Drawing Sheets

(56) References Cited

U.S. PATENT DOCUMENTS

2017/0124787 A1    5/2017  Devlin

OTHER PUBLICATIONS

USPTO, Non-final Office Action issued in U.S. Appl. No. 15/626,543, dated Feb. 16, 2018.
USPTO, Final Office Action issued in U.S. Appl. No. 15/626,543, dated Aug. 16, 2018.

* cited by examiner

TOW VEHICLE ELECTRIC CONNECTOR SYSTEM AND METHOD

TECHNICAL FIELD

This patent generally relates to tow vehicle systems, and more particularly, this patent relates to a system and method of wirelessly electrically powering and communicating between a towing vehicle and a towed vehicle.

BACKGROUND

Whether for personal, recreational or commercial purposes, it is common to utilize a road vehicle, e.g, a towing vehicle, to tow one or more trailers or vehicles, e.g., towed vehicles. In addition to a secure mechanical connection, an electrical connection is required between the towing vehicle and the towed vehicle to supply electric power for lights disposed on the towed vehicle, to operate brake and turn signal indicators on the towed vehicle, and, given the size and weight of the towed vehicle, to activate brakes provided on the towed vehicle. In this way, the activation of lights, brake and turn signal indicators and brakes on the towed vehicle is made responsive to a corresponding activation on the towing vehicle.

To provide the electric power and activation signals to the towed vehicle, an electrical connection is typically been made via a wired connection between the towing vehicle and the towed vehicle. Industry standards provide for either a 4-pin wiring connector or a 7-pin wiring connector between the towing vehicle and the towed vehicle depending primarily on the requirement for the towed vehicle to have brakes.

Frequently, the towing vehicle is provided with a 7-pin electrical connector to provide maximum flexibility for towing using either a 7-pin connector or a 4-pin connector with an adapter. Alternatively, the towing vehicle may be provided with both a 4-pin and a 7-pin connector. This later alternative adds to the complexity and cost of the towing vehicle, while the former solution requires providing an adaptor.

Moreover, the connector on the towing vehicle as well as the towed vehicle may be exposed to weather elements subjecting them to possible corrosion or contamination that could affect the electrical connection between the towing vehicle and the towed vehicle. This may also be affected by the potentially infrequent use of the connectors on the towing vehicle and the towed vehicle, and the frequency with which towed vehicles are stored in an outside environment and exposed to weather elements.

Accordingly, it is desirable to provide a towing vehicle/ towed vehicle electrical connection that is simple, reliable and meets all connection standards without multiple connectors or adapters. It is further desirable to provide towing vehicles adapted to connect to a towed vehicle in a simple and reliable manner. Furthermore, other desirable features and characteristics of the present disclosure will become apparent from the subsequent detailed description and the appended claims, taken in conjunction with the accompanying drawings and the foregoing technical field and background.

SUMMARY

In accordance with the herein described embodiments, a towing vehicle/towed vehicle connection system for operably electrically coupling a towing vehicle to a towed vehicle, the system includes a first transceiver disposed on the towing vehicle to provide a wireless electric power signal. A second transceiver is disposed on the towed vehicle and is wirelessly coupled to the first transceiver to receive the wireless electric power signal. The second transceiver is further coupled to the provide energizing electric power to the towed vehicle.

In accordance with another of the herein described embodiments, a towing vehicle/towed vehicle connection system for operably electrically coupling a towing vehicle to a towed vehicle, the system includes a first transceiver disposed on the towing vehicle to provide a wireless electric power signal. A second transceiver is disposed on the towed vehicle and is wirelessly coupled to the first transceiver to receive the wireless electric power signal. The second transceiver is further coupled to the provide energizing electric power to the towed vehicle. The first transceiver may include a first coil and the second transceiver may include a second coil, the wireless electric power signal being inductively coupled between the first coil and the second coil (i.e. coupling through magnetic-resonance also termed: magnetic resonant coupling—MRC).

In accordance with another of the herein described embodiments, a towing vehicle/towed vehicle connection system for operably electrically coupling a towing vehicle to a towed vehicle, the system includes a first transceiver disposed on the towing vehicle to provide a wireless electric power signal. A second transceiver is disposed on the towed vehicle and is wirelessly coupled to the first transceiver to receive the wireless electric power signal. The second transceiver is further coupled to the provide energizing electric power to the towed vehicle. The first transceiver and the second transceiver may be operable to communicate control data with the wireless electric power signal.

In accordance with another of the herein described embodiments, a towing vehicle/towed vehicle connection system for operably electrically coupling a towing vehicle to a towed vehicle, the system includes a first transceiver disposed on the towing vehicle to provide a wireless electric power signal. A second transceiver is disposed on the towed vehicle and is wirelessly coupled to the first transceiver to receive the wireless electric power signal. The second transceiver is further coupled to the provide energizing electric power to the towed vehicle. The first transceiver may include a first processor and the second transceiver may include a second processor, wherein the first and second processors are operable to communicate control data there between via the first and second transceivers.

In accordance with another of the herein described embodiments, a towing vehicle/towed vehicle connection system for operably electrically coupling a towing vehicle to a towed vehicle, the system includes a first transceiver disposed on the towing vehicle to provide a wireless electric power signal. A second transceiver is disposed on the towed vehicle and is wirelessly coupled to the first transceiver to receive the wireless electric power signal. The second transceiver is further coupled to the provide energizing electric power to the towed vehicle. The towed vehicle may include running lights, turn indicators, brake lights and wheel brakes that are operably electrically connected to the second transceiver to receive electrical power from the second transceiver.

In accordance with another of the herein described embodiments, a towing vehicle/towed vehicle connection system for operably electrically coupling a towing vehicle to a towed vehicle, the system includes a first transceiver disposed on the towing vehicle to provide a wireless electric power signal. A second transceiver is disposed on the towed vehicle and is wirelessly coupled to the first transceiver to receive the wireless electric power signal. The second transceiver is further coupled to the provide energizing electric power to the towed vehicle. The towed vehicle may include running lights, turn indicators, brake lights and wheel brakes that are operably electrically connected to the second transceiver to receive control data from the second transceiver, the running lights, turn indicators, brake indicators and wheel brakes being operably responsive to the control data, respectively.

In another non-limiting embodiment, a vehicle is provided includes a towed vehicle hitch for coupling a towed vehicle. The vehicle includes a first transceiver that is operable to provide a wireless electric power signal. The vehicle further includes a kit including a second transceiver operable to receive the wireless electric power signal and a connector to couple the second transceiver to a towed vehicle electrical connector.

In another non-limiting embodiment, a vehicle is provided includes a towed vehicle hitch for coupling a towed vehicle. The vehicle includes a first transceiver that is operable to provide a wireless electric power signal. The vehicle further includes a kit including a second transceiver operable to receive the wireless electric power signal and a connector to couple the second transceiver to a towed vehicle electrical connector. The vehicle may further include a mounting flange for the second transceiver.

In another non-limiting embodiment, a vehicle is provided includes a towed vehicle hitch for coupling a towed vehicle. The vehicle includes a first transceiver that is operable to provide a wireless electric power signal. The vehicle further includes a kit including a second transceiver operable to receive the wireless electric power signal and a connector to couple the second transceiver to a towed vehicle electrical connector. The first transceiver may include a first coil and the second transceiver may include a second coil, the wireless electric power signal configured to be inductively coupled between the first coil and the second coil.

In another non-limiting embodiment, a vehicle is provided includes a towed vehicle hitch for coupling a towed vehicle. The vehicle includes a first transceiver that is operable to provide a wireless electric power signal. The vehicle further includes a kit including a second transceiver operable to receive the wireless electric power signal and a connector to couple the second transceiver to a towed vehicle electrical connector. The first transceiver is operable to communicate control data with the wireless electric power signal.

In another non-limiting embodiment, a vehicle is provided includes a towed vehicle hitch for coupling a towed vehicle. The vehicle includes a first transceiver that is operable to provide a wireless electric power signal. The vehicle further includes a kit including a second transceiver operable to receive the wireless electric power signal and a connector to couple the second transceiver to a towed vehicle electrical connector. The first transceiver may include a first processor and the second transceiver may include a second processor, wherein the first and second processors are operable to communicate control data via the first and second transceivers.

In another non-limiting embodiment, a vehicle is provided includes a towed vehicle hitch for coupling a towed vehicle. The vehicle includes a first transceiver that is operable to provide a wireless electric power signal. The vehicle further includes a kit including a second transceiver operable to receive the wireless electric power signal and a connector to couple the second transceiver to a towed vehicle electrical connector. The towed vehicle may include running lights, turn indicators, brake lights and wheel brakes that are operably electrically connected to the second transceiver via the connector to receive electrical power from the second transceiver.

In another non-limiting embodiment, a vehicle is provided includes a towed vehicle hitch for coupling a towed vehicle. The vehicle includes a first transceiver that is operable to provide a wireless electric power signal. The vehicle further includes a kit including a second transceiver operable to receive the wireless electric power signal and a connector to couple the second transceiver to a towed vehicle electrical connector. The towed vehicle may include running lights, turn indicators, brake lights and wheel brakes that are operably electrically connected to the second transceiver via the connector to receive control data from the second transceiver, the running lights, turn indicators, brake indicators and wheel brakes being operably responsive to the control data, respectively.

In another non-limiting embodiment, a method of operably electrically coupling a towing vehicle to a towed vehicle may include providing a first transceiver disposed on the towing vehicle and providing a second transceiver disposed on the towed vehicle. The second transceiver is electrically coupled to the towed vehicle. The method may include communicating a wireless electric power signals from the first transceiver, and receiving the wireless electric power signal at the second transceiver. The second transceiver provides electric power to the towed vehicle responsive to the wireless electric power signal.

In another non-limiting embodiment, a method of operably electrically coupling a towing vehicle to a towed vehicle may include providing a first transceiver disposed on the towing vehicle and providing a second transceiver disposed on the towed vehicle. The second transceiver is electrically coupled to the towed vehicle. The method may include communicating a wireless electric power signals from the first transceiver, and receiving the wireless electric power signal at the second transceiver. The second transceiver provides electric power to the towed vehicle responsive to the wireless electric power signal. The first transceiver may include a first coil and the second transceiver may include a second coil, the method comprising inductively coupling the wireless electric power signal between the first coil and the second coil.

In another non-limiting embodiment, a method of operably electrically coupling a towing vehicle to a towed vehicle may include providing a first transceiver disposed on the towing vehicle and providing a second transceiver disposed on the towed vehicle. The second transceiver is electrically coupled to the towed vehicle. The method may include communicating a wireless electric power signals from the first transceiver, and receiving the wireless electric power signal at the second transceiver. The second transceiver provides electric power to the towed vehicle responsive to the wireless electric power signal. The method may further include communicating control data with the wireless electric power signal.

In another non-limiting embodiment, a method of operably electrically coupling a towing vehicle to a towed vehicle may include providing a first transceiver disposed on the towing vehicle and providing a second transceiver disposed on the towed vehicle. The second transceiver is electrically coupled to the towed vehicle. The method may include communicating a wireless electric power signals from the first transceiver, and receiving the wireless electric power signal at the second transceiver. The second transceiver provides electric power to the towed vehicle responsive to the wireless electric power signal. The first transceiver may include a first processor and the second transceiver may include a second processor, the method further comprising communicating control data between the first processor and the second processor via the first and second transceivers.

In another non-limiting embodiment, a method of operably electrically coupling a towing vehicle to a towed vehicle may include providing a first transceiver disposed on the towing vehicle and providing a second transceiver disposed on the towed vehicle. The second transceiver is electrically coupled to the towed vehicle. The method may include communicating a wireless electric power signals from the first transceiver, and receiving the wireless electric power signal at the second transceiver. The second transceiver provides electric power to the towed vehicle responsive to the wireless electric power signal. The method may further include operating running lights, turn indicators, brake lights and wheel brakes disposed on the towed vehicle responsive to the wireless electric power signal.

In another non-limiting embodiment, a method of operably electrically coupling a towing vehicle to a towed vehicle may include providing a first transceiver disposed on the towing vehicle and providing a second transceiver disposed on the towed vehicle. The second transceiver is electrically coupled to the towed vehicle. The method may include communicating a wireless electric power signals from the first transceiver, and receiving the wireless electric power signal at the second transceiver. The second transceiver provides electric power to the towed vehicle responsive to the wireless electric power signal. The method may further include operating running lights, turn indicators, brake lights and wheel brakes disposed on the towed vehicle responsive to communicated control data and the wireless electric power signal

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
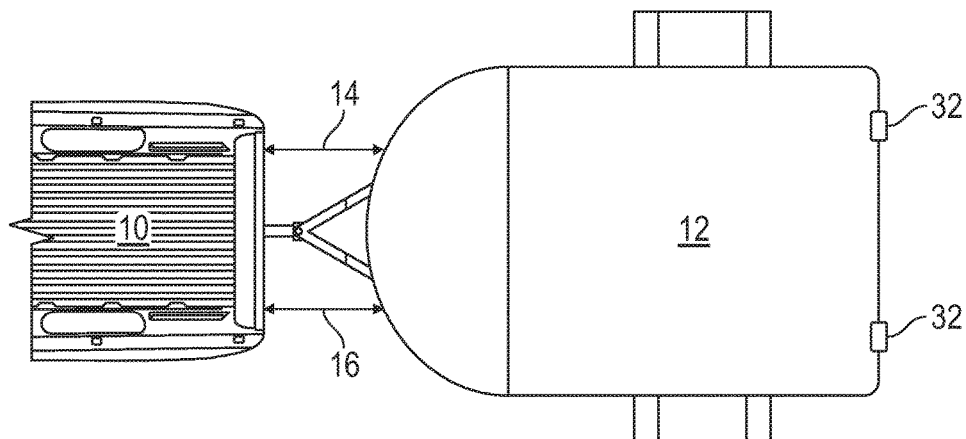
FIG. 1 is a block diagram illustration of a towing vehicle/towed vehicle electrical connector system in accordance with the herein described embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term system or module may refer to any combination or collection of mechanical and electrical hardware, software, firmware, electronic control component, processing logic, and/or processor device, individually or in any combination, including without limitation: application specific integrated circuit (ASIC), an electronic circuit, a processor (shared, dedicated, or group), memory that executes one or more software or firmware programs, a combinational logic circuit, and/or other suitable components that provide the described functionality.

Embodiments of the invention may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment of the invention may employ various combinations of mechanical components and electrical components, e.g., integrated circuit components, memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of mechanical and/or electronic systems, and that the vehicle systems described herein are merely exemplary embodiments of the invention.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Referring to FIG. 1 a towing vehicle 10 is shown operably coupled a towed vehicle 12. That is, a conventional mechanical coupling 14 is provided between the towing vehicle 10 to the towed vehicle 12, while an electrical coupling 16 in accordance with the herein described embodiments is also provided.

Figure 2:
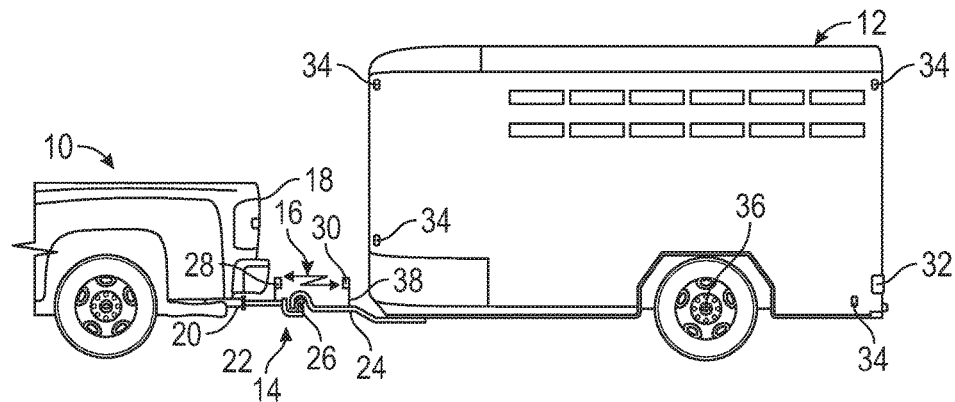
FIG. 2 is a graphic illustration of a towing vehicle/towed vehicle electrical connector system in accordance with the herein described embodiments.
Figure 3:
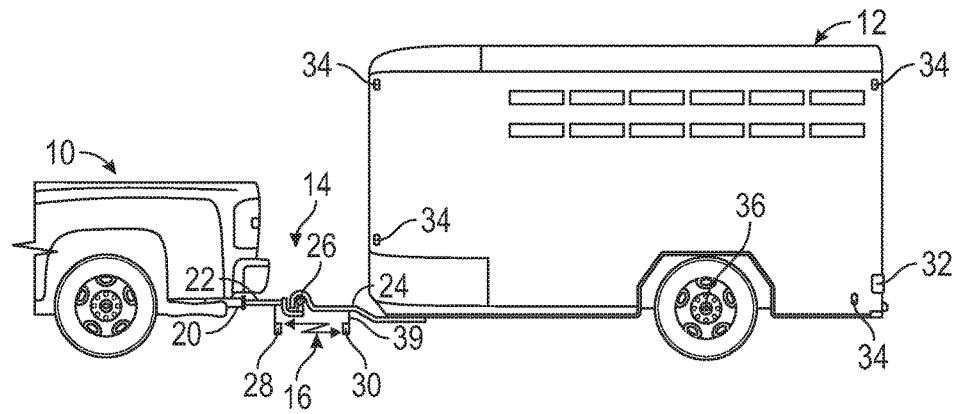
FIG. 3 is a graphic illustration of a towing vehicle/towed vehicle electrical connector system in accordance with another of the herein described embodiments.

With continued reference to FIG. 1 and reference also to FIGS. 2 and 3, associated with a rear portion 18 of the towing vehicle 10 is a hitch receiver 20 and/or a hitch ball 22. The towed vehicle 12 includes a forwarded extending hitch portion 24 including a coupler 26 to engage the hitch ball 22 to form a secure mechanical connection between the towing vehicle 10 and the towed vehicle 12.

Provided on the rear portion 18, hitch receiver 20 and/or the hitch ball 22 is a transceiver 28. The transceiver 28 is electrically coupled by wire connection (not depicted) to a source of electrical power and data from the towing vehicle 10. For example, the transceiver 28 is coupled to receive electric power and data indicative of the towing vehicle 10 lights, turn indicators and brakes.

Provided on the hitch portion 24 of the towed vehicle 12 is a transceiver 30. The transceiver 30 is electrically coupled by wired connections (not depicted) to the towed vehicle brake lights and turn indicators 32, running lights 34 and brakes 36, if the towed vehicle is so equipped. The transceiver 30 may be further electrically coupled to a energy storage device (not depicted), e.g., a battery, which provides electrical energy to the brakes 36 should the towed vehicle 12 become disconnected from the towing vehicle 10.

As depicted in FIG. 2, the transceiver 30 may be disposed on a mounting flange 38 extending above (as shown in FIG. 2) the hitch portion 24. Alternatively, the transceiver 30 may be disposed on a mounting flange 39 extending below (as shown in FIG. 3) the hitch portion 24. In this way, the transceiver 30 may be made to align with the transceiver 28 disposed on the towing vehicle 10.

As shown in FIGS. 2 and 3, the transceivers 28 and 30 are arranged to be disposed in close proximity to permit wireless capacitive coupling (electrostatic induction) between metal electrodes (not depicted), or inductive coupling (electromagnetic induction) between coils of wire (not depicted) disposed respectively within the transceivers 28 and 30. In this manner, motive electrical power may be communicated from the transceiver 28 to the transceiver 30 to energize the towed vehicle 12. The arrangement of transceiver 28 and 30 may be essentially open loop, in that transceiver 30 when energized couples power to transceiver 30 energizing the towed vehicle 12, but without providing any data or control signals. Alternatively, the transceivers 28 and 30 may be configured to communicate one or more data to signal to the towed vehicle 12 activation of the brake lights and turn indicators 32, the running lights 34 and the brakes 36.

Figure 4:
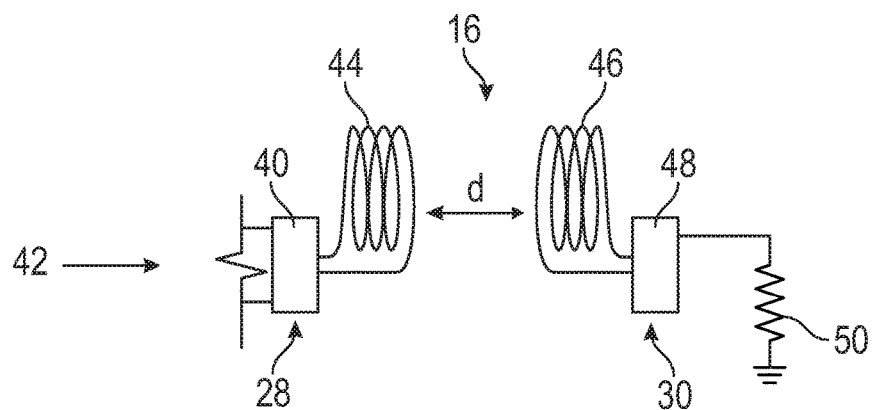
FIG. 4 is a schematic circuit diagram of a wireless transmitter/receiver that may be used in a towing vehicle/towed vehicle electrical connector system in accordance with the herein described embodiment.

FIG. 4 depicts an exemplary arrangement of transceivers 28 and 30 utilizing inductive coupling. Transceiver 28 includes a signal generator 40 that is responsive to an input signal 42 to couple a driving signal to a primary coil 44. Transceiver 30 includes a secondary coil 46 that couples to a transformer/rectifier 48 that is coupled to provide electric power to a load 50, for example, the towed vehicle 12.

In one exemplary implementation, the coupling may be done on the magnetic plane at a suitable frequency, and for example at a frequency of 13.56 Mhz. To communicate a bit of data from the transceiver 28 to the transceiver 30, a phase of the input signal 42 may be shifted. The phase shift is then detected by the transceiver 30 as either a bit of data. Within the transceiver 30, the load impedance may be shifted. The load impedance shift may be detected within the transceiver 28, for example as a phase shift reflection in the primary coil 44, effectively providing an ability to communicate a bit of data.

Figure 5:
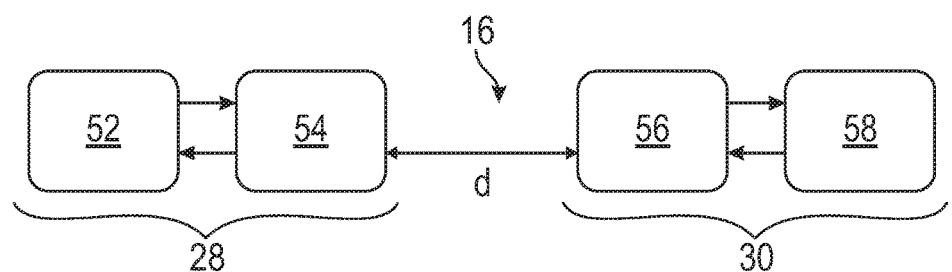
FIG. 5 is a functional block diagram of a wireless transmitter/receiver that may be used in a towing vehicle/towed vehicle electrical connector system in accordance with the herein described embodiment.

The functional block diagram arrangement depicted in FIG. 5 of transceivers 28 and 30 further illustrate how the transceivers 28 and 30 may be arranged to communicate data in excess of single bit, such as control signals from the towing vehicle 10 to the towed vehicle 12, and data and signals from the towed vehicle 12 to the towing vehicle 10.

As depicted, the transceiver 28 on the towing vehicle 10 may be configured to include a signal processor 52 operatively coupled to a transmit/receive element 54 that would include operatively coupled a coil and a transformer and a signal generator/signal detector (not depicted). The transceiver 30 associated with the towed vehicle 12 may similarly be configured to include a transmit/receive element 56 that would include a coil operatively coupled to a signal detector/generator and transformer (not depicted) coupled to a signal processor 58.

The signal processor 52 may generate one or more data to be communicated from the towing vehicle 10 to the towed vehicle 12. The data may be modulated onto the signal communicated from the element 54 to the element 56, and the data may be decoded by the signal processor 58. The data may be modulated as complex data within the communicated signal using a suitable keying method, or may be modulated as serial bits of data communicated as phase shifted signals as discussed above. Likewise, the signal processor 58 may generate one or more data to be communicated from the towed vehicle 12 to the towing vehicle 10.

In accordance with the herein described exemplary embodiment, a towing vehicle 10 and a towed vehicle 12 may be assuredly electrically coupled such that control of the towed vehicle 12 brake and turn indicator lights 32, running lights 34 and brakes 36 operate responsive to control signals provided by the towing vehicle 10. Advantageously, use of wireless coupling of the towing vehicle 10 with the towed vehicle 12, permits an improved coupling process as there no longer is required to have the correct connector configuration, 7-pin or 4-pin or adapters, on the towing vehicle 10 and towed vehicle 12.

Figure 6:
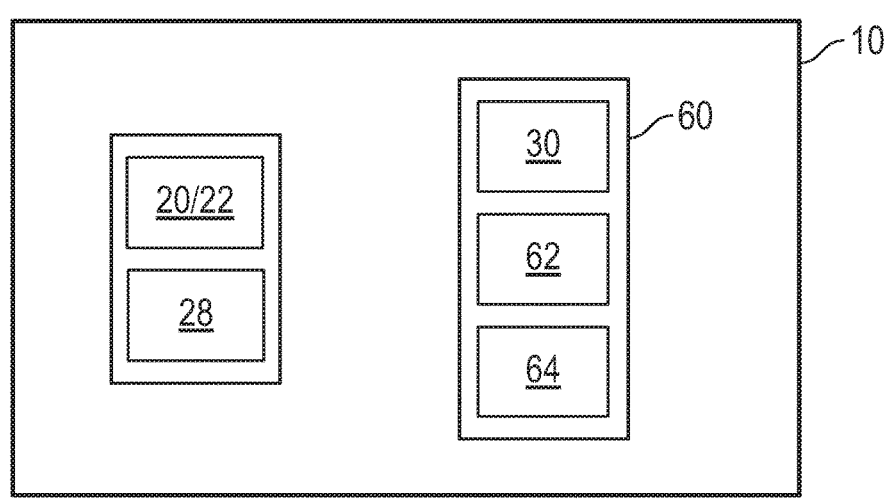
FIG. 6 is a block diagram illustration of a towing vehicle including a towed vehicle electrical connector system kit in accordance with the herein described embodiments.

Referring to FIG. 6, the towing vehicle 10 may be configured as original equipment to include the transceiver 28 and to have the ability to wireless couple to a towed vehicle 12. However, given the variety of towed vehicles, one may want to be provided the necessary equipment to configured a towed vehicle 12 for wireless coupling. As depicted in FIG. 6, the towing vehicle 10 may include a kit 60 that includes a mechanical mounting 62, such as a flange member, e.g., flange 40 or 42, that may be secured to the hitch portion 26 of the towed vehicle 12; a transceiver 30 that may be coupled to the flange member 40 or 42, and a connector 64 to allow the existing wired connector to be coupled to the transceiver 30. In this way, any towable vehicle may be configured for wireless coupling as towed vehicle 12 in accordance with the herein described embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A towing vehicle/towed vehicle connection system for operably electrically coupling a towing vehicle to a towed vehicle, the system comprising:

a hitch assembly disposed on the towing vehicle and a towing vehicle-side flange assembly secured to the hitch assembly, the towing vehicle-side flange assembly having a first flange surface arranged to face toward the towed vehicle;

a first transceiver disposed on the first flange surface, the first transceiver operable to provide a wireless electric power signal;

a towed vehicle-side flange assembly secured to the towed vehicle, the towed vehicle-side flange assembly having a second flange surface arranged to face toward the towing vehicle in proximate, radial alignment with the first flange surface; and a second transceiver disposed on the second surface and wirelessly coupled to the first transceiver to receive the wireless electric power signal and further configured to provide energizing electric power to the towed vehicle; wherein the arrangement of the vehicle-side flange assembly and the towed vehicle-side flange assembly maintains the first transceiver and the second transceiver in proximate, radial relationship.

2. The system of claim 1, the first transceiver including a first coil and the second transceiver including a second coil, the wireless electric power signal being inductively coupled between the first coil and the second coil.

3. The system of claim 1, the first transceiver and the second transceiver operable to communicate control data with the wireless electric power signal.

4. The system of claim 1, the first transceiver including a first processor and the second transceiver including a second processor, wherein the first and second processors are operable to communicate control data there between via the first and second transceivers.

5. The system of claim 1, the towed vehicle comprising running lights, turn indicators, brake lights and wheel brakes that are operably electrically connected to the second transceiver to receive electrical power from the second transceiver.

6. The system of claim 1, the towed vehicle comprising running lights, turn indicators, brake lights and wheel brakes that are operably electrically connected to the second transceiver to receive control data from the second transceiver, the running lights, turn indicators, brake indicators and wheel brakes being operably responsive to the control data, respectively.

7. The system of claim 1, further comprising operating running lights, turn indicators, brake lights and wheel brakes disposed on the towed vehicle responsive to communicated control data and the wireless electric power signal.

8. A vehicle comprising:
a towed vehicle hitch;
a vehicle-side flange assembly secured to the towed vehicle hitch, the vehicle-side flange assembly have a first flange surface arranged to face toward the towed vehicle
a first transceiver disposed on the first flange surface, the first transceiver operable to provide a wireless electric power signal; and
a kit comprising a towed vehicle-side flange assembly adapted to be secured to the towed vehicle, the towed vehicle-side flange assembly having a second flange surface arranged to face toward the towing vehicle in proximate, radial alignment with the first flange surface and a second transceiver adapted to be secured to second flange surface and operable to receive the wireless electric power signal, the second transceiver further including a connector configured to accept a standard 4-pin/7-pin towed vehicle wired connector to couple the second transceiver to a towed vehicle electrical connector; wherein
the arrangement of the vehicle-side flange assembly and the towed vehicle-side flange assembly maintains the first transceiver and the second transceiver in proximate, radial relationship.

9. The vehicle of claim 8, the first transceiver including a first coil and the second transceiver including a second coil, the wireless electric power signal configured to be inductively coupled between the first coil and the second coil.

10. The vehicle of claim 8, the first transceiver operable to communicate control data with the wireless electric power signal.

11. The vehicle of claim 8, the first transceiver including a first processor and the second transceiver including a second processor, wherein the first and second processors are operable to communicate control data via the first and second transceivers.

12. The vehicle of claim 8, the towed vehicle comprising running lights, turn indicators, brake lights and wheel brakes that are operably electrically connected to the second transceiver via the connector to receive electrical power from the second transceiver.

13. The vehicle of claim 8, the towed vehicle comprising running lights, turn indicators, brake lights and wheel brakes that are operably electrically connected to the second transceiver via the connector to receive control data from the second transceiver, the running lights, turn indicators, brake indicators and wheel brakes being operably responsive to the control data, respectively.

14. A method of operably electrically coupling a towing vehicle to a towed vehicle, the method comprising:
configuring the towing vehicle with a vehicle-side flange assembly secured to the towed vehicle hitch, the vehicle-side flange assembly having a first flange surface arranged to face toward the towed vehicle
providing a first transceiver disposed on the first flange surface of the towing vehicle;
configuring the towed vehicle with a towed vehicle-side flange assembly secured to the towed vehicle, the towed vehicle-side flange assembly having a second flange surface arranged to face toward the towing vehicle in proximate, radial alignment with the first flange surface;
providing a second transceiver disposed on the second flange surface of the towed vehicle, the second transceiver operably electrically coupled to the towed vehicle and in proximate, radial relationship with the first transceiver;
communicating a wireless electric power signals from the first transceiver;
receiving the wireless electric power signal at the second transceiver; and
providing energizing electric power to the towed vehicle from the second transceiver responsive to the wireless electric power signal.

15. The method of claim 14, the first transceiver including a first coil and the second transceiver including a second coil, the method comprising inductively coupling the wireless electric power signal between the first coil and the second coil.

16. The method of claim 14, further comprising communicating control data with the wireless electric power signal.

17. The method of claim 14, the first transceiver including a first processor and the second transceiver including a second processor, the method further comprising communicating control data between the first processor and the second processor via the first and second transceivers.

18. The method of claim 14, further comprising operating running lights, turn indicators, brake lights and wheel brakes disposed on the towed vehicle responsive to the wireless electric power signal.

* * * * *